3,300,020
ARTICLE TRANSFER APPARATUS
Gary G. Seaman, Omaha, and James A. Trenerry, Millard, Nebr., assignors to Western Electric Company, Incorporated, New York, N.Y., a corpration of New York
Filed May 28, 1965, Ser. No. 459,790
6 Claims. (Cl. 198—25)

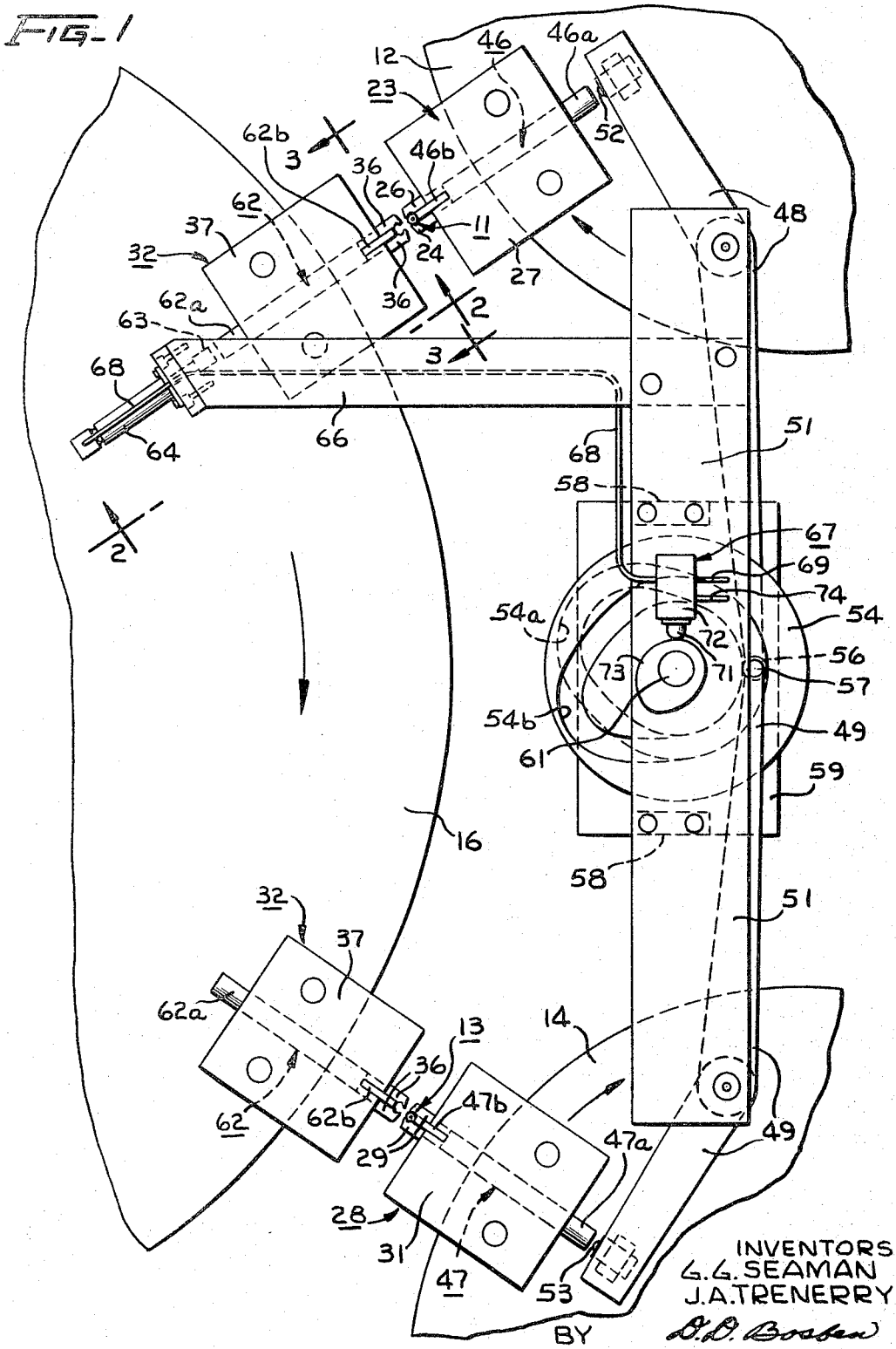

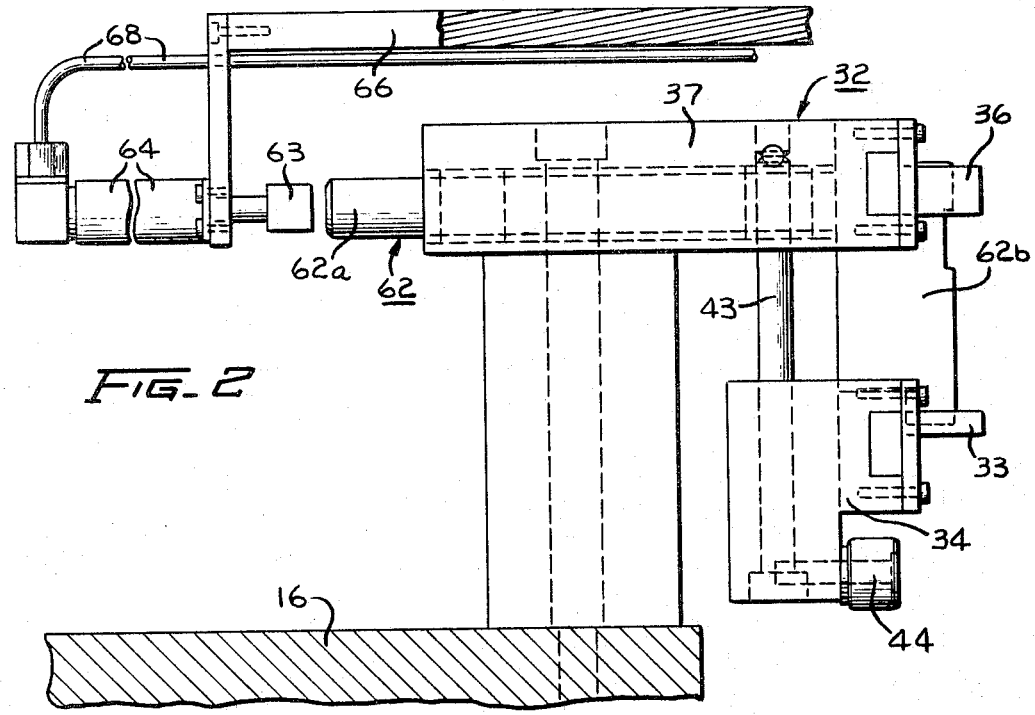
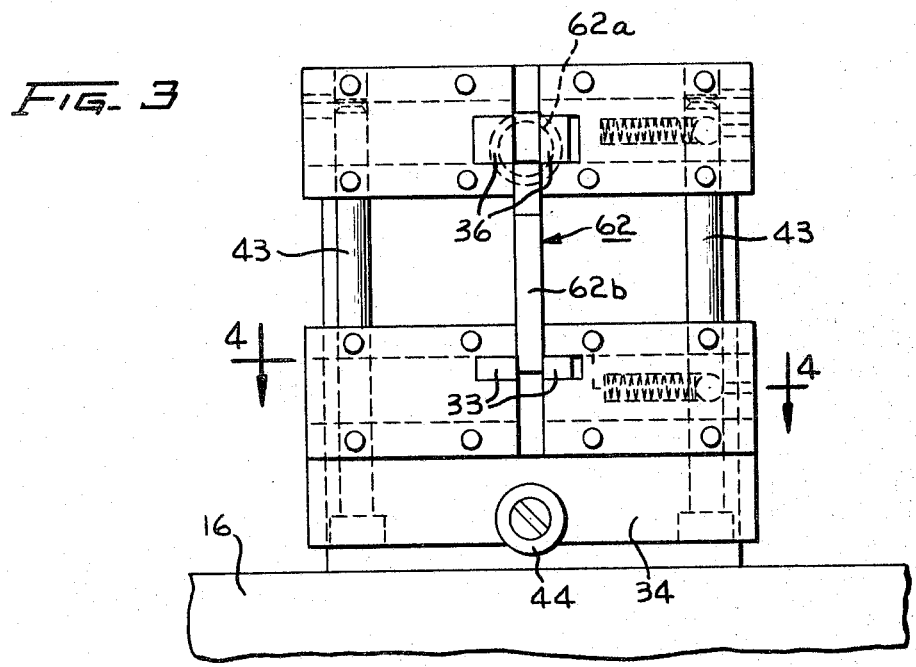

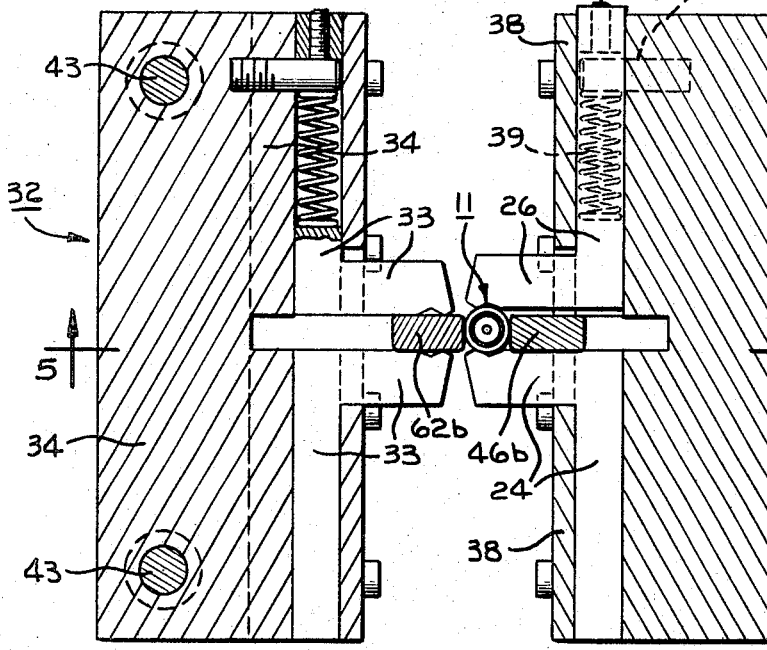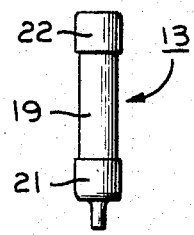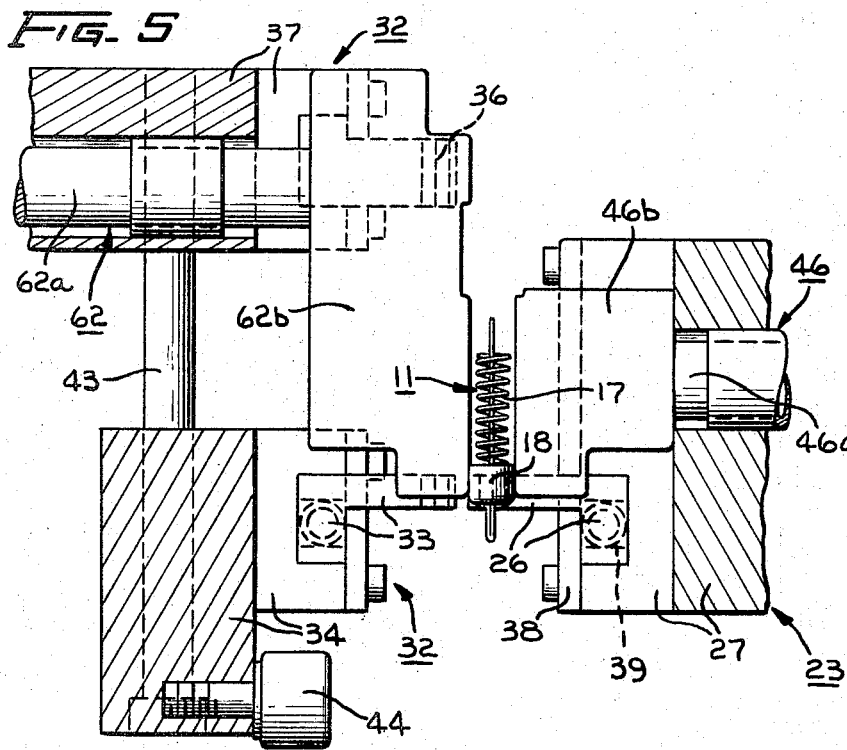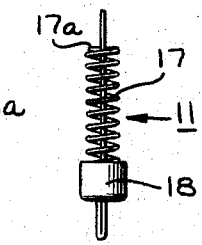

This invention relates to article transfer apparatus, and more particularly to apparatus for transferring an article from a first support to a second support without disturbing the orientation of the article about a preselected axis.

Certain electrical fuse assemblies used extensively in telephone switching equipment each include a multi-part sub-assembly which includes a coil spring having one end seated in a cap member and secured thereto. An end coil at the other end of the coil spring is seated on and secured to one end of a multipart tubular body subassembly. The nature of the subassemblies is such that the assembling of their respective parts, and the subsequent assembly of the subassemblies to one another, cannot readily be accomplished on a single assembling table. Accordingly, in accordance with one method of manufacturing these fuse assemblies, assembling of the parts of the spring and cap sub-assembly, including the welding of the spring to the cap member, is accomplished on a first indexing table, and assembling of the parts of the tubular body subassembly is accomplished on a second indexing table. The sub-assemblies then are transferred to a third indexing table for the assembling of the subassemblies to one another, including the securing, by welding, of the end coil of the coil spring to the tubular body sub-assembly.

More specifically, since the cap member is gripped firmly in gripping jaws on the first and third indexing tables during the assembling operations, orientation of the coil spring so that the end coil of the coil spring will be properly presented to a welding mechanism associated with the third indexing table, for the securing of the end coil to the tubular body subassembly, is accomplished on the first indexing table before the spring is welded to the cap member. Thus, in accordance with the fuse assembly manufacturing method being described, it is necessary to transfer the spring and cap subassembly from the first indexing table to the third indexing table without disturbing the orientation of the spring and cap subassembly about its longitudinal axis. Otherwise, the end coil of the coil spring may be improperly welded to the tubular body subassembly, resulting in a defective part.

Accordingly, an object of this invention is to provide new and improved apparatus for transferring an article from a first support to a second support without disturbing the orientation of the article about a preselected axis.

A further object of this invention is to provide new and improved apparatus for transferring first and second articles from respective first and second supports to an indexing support on which the articles are to be assembled to one another, in which at least one of the articles is transferred without disturbing its orientation about a preselected axis.

In accordance with the invention, apparatus for transferring an article from a first support to a second support without disturbing the orientation of the article about a preselected axis includes an article holding mechanism on the first support and an article receiving mechanism on the second support. Initially, advancing means moves a retarding member to an advanced position between gripping jaws of the article receiving mechanism substantially into engagement with the article in the article-holding mechanism. A pusher member then is moved between article gripping jaws of the article holding mechanism to transfer the article to the article receiving mechanism, while pushing the retarding member to a retracted position against the action of the advancing means such that the retarding member and the pusher member frictionally engage the article therebetween to prevent rotation of the article about the preselected axis. The advancing means then is rendered inoperative to preclude ejection of the article from the article receiving mechanism by the retarding member.

In a preferred embodiment of the invention, first and second articles are transferred from respective article gripping mechanisms into respective article receiving mechanisms on an indexing support, and one of the article receiving mechanisms is movably mounted on the other article receiving mechanism for assembling of the articles to one another. Prior to the transfer of at least one of the articles from its associated article gripping mechanism, an advancing means moves a pusher means to an advanced position between article gripping members of the article receiving mechanism which is to receive the article, substantially into engagement with the article. A pusher member then is moved between article gripping members of the article gripping mechanism to transfer the article to the article receiving mechanism. During this transfer operation the advancing means tends to retain the pusher means in its advanced position such that the article and the pusher member push the pusher means to its retracted position against the action of the advancing means, whereby the pusher means and the pusher member grip the article firmly therebetween to prevent rotation of the article about a preselected axis. The advancing means then is rendered inoperative so that the indexing support can be indexed to a next position without the article being ejected from the article receiving mechanism by the pusher means. Preferably, the article gripping members are substantially identical in construction and grip the article firmly during the transfer operation to help prevent rotation of the article about the preselected axis.

This invention together with further objects and advantages thereof will best be understood by reference to the following detailed description taken in connection with the accompanying drawings, in which:

FIG. 1 is a plan view of the apparatus in a first operating position;

FIG. 2 is a partial, cross-sectional view of the apparatus taken substantially along the line 2—2 of FIG. 1;

FIG. 3 is a partial elevational view of the apparatus taken substantially along the line 3—3 of FIG. 1;

FIG. 4 is a partial cross-sectional view of the apparatus taken substantially along the line 4—4 of FIG. 3 and showing the apparatus in a second operating position;

FIG. 5 is a partial cross-sectional view of the apparatus taken substantially along the line 5—5 of FIG. 4;

FIG. 6 shows a tubular body subassembly which forms a part of an electrical fuse assembly; and FIG. 7 shows a spring and cap subassembly which forms a part of an electrical fuse assembly.

Referring to FIGS. 1, 6 and 7, it is seen that the illustrated embodiment of the invention is designed for transferring spring and cap sub-assemblies 11 (FIG. 7) on a first indexing table 12 (FIG. 1), and tubular body subassemblies 13 (FIG. 6) on a second indexing table 14, to a third indexing table 16. Each spring and cap subassembly 11 includes a coil spring 17 seated in and welded to a cap member 18. Each tubular body subassembly 13 includes a tubular body member 19 having a ferrule 21 on one end and a cap member 22 on its other end. On the third indexing table 16, the subassemblies 11 and 13 are assembled to one another and are combined with other parts in operations forming no part of this invention, to form electrical fuse assemblies used in telephone switching systems.

More specifically, the coil spring 17 of each subassembly 11 is welded to the cap member 18 of the subassembly at at processing station (not shown) on the first indexing table 12 in a preselected orientation with respect to the first indexing table so that a terminal portion 17a (FIG. 7) of an upper coil of the spring, after the subassembly has been transferred to the third indexing table 16, will be properly presented to welding apparatus (not shown) associated with the third indexing table, for welding of the terminal portion to the ferrule 21 of one of the body subassemblies 13. In this regard, the apparatus is designed to transfer the spring and cap subassembly 11 from the first indexing table 12 to the third indexing table 16 without disturbing this orientation of the coil spring 17, that is, without any substantial rotation of the spring and cap subassembly about its vertical longitudinal axis. The orientation of the coil spring 17 and the welding of the spring to the cap member 18 may be accomplished by apparatus as disclosed in our copending application, Serial No. 432,213, filed February 12, 1965, and assigned to the same assignee.

Referring to FIG. 1, it is seen that each spring and cap subassembly 11 is carried on the first indexing table 12 in one of a plurality of article gripping mechanisms 23 (only one shown), in which the cap member 18 of the subassembly is gripped firmly by spaced opposed gripping jaws 24 and 26 mounted in a housing 27 suitably fixed to the table. Similarly, each tubular body subassembly 13 is carried on the second indexing table 14 in one of a plurality of article gripping mechanism 28 (only one shown), with the body 19 of the subassembly firmly gripped by article gripping jaws 29 mounted in a housing 31 suitably fixed to the table. The indexing tables 12 and 14 are indexible clockwise, as viewed in FIG. 1, to move successive ones of the article gripping mechanisms 23 and 28 into subassembly transfer positions, as shown in this figure.

Each spring and cap subassembly 11 is transferred from the gripping jaws 24 and 26 of its associated article gripping mechanism 23 to one of a plurality of article gripping mechanisms 32 on the third indexing table 16, into lower article gripping jaws 33 (FIGS. 2, 3 and 5) mounted in a lower housing 34. Similarly, each tubular body subassembly 13 is transferred from its associated article gripping mechanism 28 to one of the article gripping mechanisms 32, into upper gripping jaws 36 in an upper housing 37. In this regard, the third indexing table also is indexible clockwise, as viewed in FIG. 1, to move each of the article gripping mechanisms 32 thereon into a position opposite one of the article gripping mechanisms 23, for receiving one of the spring and cap subassemblies 11, and then into a position opposite one of the article gripping mechanisms 28, for receiving one of the tubular body subassemblies 13.

Since the construction of the gripping jaws 24 and 26, 29, 33 and 36, and the arrangement thereof in their respective housings 27, 31, 34 and 37, is substantially identical, only one of the sets of jaws will be described. Referring to FIGS. 4 and 5 and the article gripping mechanism 23 shown therein, it is seen that each of the gripping jaws 24 and 26 of the article gripping mechanism includes first and second legs disposed at a right angle with respect to one another. The first legs of the gripping jaws 24 and 26 are positioned in horizontally extending slots in horizontally spaced projecting portions of the housing 27, and the second legs of the gripping jaws project to the left, as viewed in FIGS. 4 and 5, in opposed, spaced relationship through openings in cover plates 38 for the slots, the cover plates being secured to the projecting portions by suitable screws. The gripping jaw 24 is fixed in position, while the gripping jaw 26 is slidably mounted in its associated slot and is biased toward the first jaw 24 by a coil spring 39 disposed in a recess in the first leg of the jaw 26 between a wall portion of the leg and a dowel 41 which projects into the recess and which is force-fitted into the housing 27. The movable jaw 26 carries an adjusting screw 42, which is engaged with the dowel 41, for adjusting the spacing of the jaws 24 and 26.

The upper housing 37 of each article gripping mechanism 32 is fixedly mounted on the third indexing table 16 in a suitable manner, as shown in FIGS. 2 and 3, and the lower housing 34 of the article gripping mechanism is vertically slidable on a pair of laterally spaced, vertically depending shafts 43 having upper portions thereof fixedly mounted in the upper housing, and having their lower ends provided with enlarged head portions for limiting the downward movement of the lower housing. A roller 44 is mounted on the lower housing 34 and is engageable by lifting apparatus (not shown) which is located at subsequent stations on the third indexing table 16 and which is designed to move the lower housing vertically upward into a position adjacent the upper housing 37 for the assembling of a spring and cap subassembly 11 in the lower housing to a tubular body subassembly 13 in the upper housing, including the welding of the terminal portion 17a of the upper coil of the coil spring 17 of the spring and cap subassembly to the ferrule 21 of the body subassembly, as described hereinabove.

Referring to FIGS. 1 and 5, it is seen that each article gripping mechanism 23 on the first indexing table 12 includes a reciprocally mounted article ejector 46. The ejector 46 includes a cylindrical plunger portion 46a slidable longitudinally in the housing 27 and having one end which projects beyond the housing radially inward with respect to the indexing table 12, as shown in FIG. 1. Integrally connected to the other end of the plunger portion 46a, as by welding, is a vertically extending substantially plate-like ejector portion 46b which is movable in a vertical slot in the housing 27 between the gripping jaws 24 and 26 for pushing one of the spring and cap subassemblies 11 from these gripping jaws into the lower gripping jaws 33 of one of the article gripping mechanisms 32 on the third indexing table 16 when the article gripping mechanisms are opposite one another, as shown in FIGS. 1, 4 and 5.

Similarly, as is best shown in FIG. 1, each tubular body subassembly 13 is transferred from its associated article gripping mechanism 28 into the upper jaws 36 of an opposite one of the article gripping mechanisms 32, by an article ejector 47. The ejector 47, as in the case of the ejector 46 of the article gripping mechanism 23, includes a cylindrical plunger portion 47a slidably mounted in the housing 31 and a vertically extending plate-like portion 47b movable between the gripping jaws 29.

Referring to FIG. 1, it is seen that movement of the ejectors 46 and 47 to push the subassemblies 11 and 13 from the article gripping mechanisms 23 and 28 into the article gripping mechanisms 32, is accomplished by a mechanism including bell crank levers 48 and 49. The bell crank lever 48 is pivoted adjacent one end of a horizontally extending support member 51 and has an ejector contacting member 52 mounted thereon adjacent an outer end thereof and engageable with the projecting end of the cylindrical plunger portion 46a of each ejector 46 for moving the ejector to an advanced article ejecting position between its associated jaws 24 and 26. The bell crank lever 49 is pivoted adjacent an opposite end of the support member 51 and also carries an ejector contacting member 53 adjacent an outer end thereof, the contacting member being engageable with the projecting cylindrical plunger portion 47a of each ejector 47 for moving the ejector to an advanced article ejecting position between its associated gripping jaws 29.

The levers 48 and 49 are operated by a horizontally disposed cam 54, and an inner end of the lever 48 carries a cam follower 56 which rides in a first cam track 54a formed in the bottom of the operating cam, while an inner end of the lever 49 carries a cam follower 57 which rides in a second cam track 54b formed in the top of the operating cam. The support member 51 is fixedly mounted on upper ends of horizontally spaced vertical posts 58 having lower ends thereof fixed to a base plate 59, and the operating cam 54 is secured to a vertical rotating shaft 61 journalled at its upper end in the support member 51 and having its lower end journalled in the base plate.

As is best shown in FIGS. 2, 3 and 5, each article gripping mechanism 32 on the third indexing table 16 also includes an article ejector 62 having a cylindrical plunger portion 62a slidably mounted for longitudinal movement in the upper housing 37 of the gripping mechanism with one end of the plunger portion projecting beyond the housing and the other end of the plunger portion having a vertically extending substantially plate-like portion 62b integral therewith. The ejector 62 differs from the ejectors 46 and 47, however, in that it is common to both the upper and lower housings 37 and 34 of the article gripping mechanism 32, with the vertically extending plate-like portion 62b of the ejector extending vertically in vertically aligned slots in the housings and being movable horizontally in the aligned slots between both the upper and lower gripping jaws 36 and 33 of the gripping mechanism.

Any substantial rotation of one of the spring and cap sub-assemblies 11 during the transfer thereof from its associated article gripping mechanism 23 into the lower jaws 33 of the opposite article gripping mechanism 32 is precluded by its being firmly gripped between the ejectors 46 and 62 of the article gripping mechanisms during the transfer operation. In this regard, as is shown in FIGS. 1 and 2, when the article gripping mechanisms 23 and 32 are opposite one another, the plunger portion 62a of the ejector 62 of the article gripping mechanism 32 is in alignment with a piston rod 63 of an air cylinder 64. The air cylinder 64 is fixedly mounted in a suitable manner on one end of an elongated bracket 66 secured at its other end to the support member 51. When the air cylinder 64 is actuated its piston rod 63 moves forward into engagement with the plunger portion 62a of the ejector 62 and moves the ejector from a retracted position, as shown in FIGS. 1 and 2, to an advanced position and substantially into engagement with the spring and cap sub-assembly 11 in the gripping jaws 24 and 26 of the article gripping mechanism 23, as is illustrated in FIGS. 4 and 5.

The operating cam 54 then pivots the bell crank lever 48 to engage the contacting member 53 with the plunger portion 46a of the ejector 46 of the article gripping mechanism 23, and to advance the ejector to push the spring and cap subassembly 11 from the jaws 24 and 26 into the lower jaws 33 of the article gripping mechanism 32. During this transfer operation, the air cylinder 64 remains operated so that the ejector 62 acts as a retarding member and tends to retard movement of the spring and cap subassembly 11 into the lower jaws 33. However, as pressure is applied to the ejector 46, the subassembly cap member 18 and the ejector 62, by the bell crank lever 48, the air in the air cylinder becomes compressed, thereby permitting the transfer of the subassembly to take place. Thus, during the transfer of the spring and cap subassembly 11 it is firmly engaged between the ejectors 46 and 62 such that the ejectors, through frictional engagement with the cap member 18 of the subassembly, prevent any substantial rotation of the subassembly. In this regard, the tendency for the spring and cap subassembly 11 to rotate during the transfer operation also is reduced by its cap member 18 being firmly gripped and frictionally engaged by the jaws 24, 26 and 33, and as a result of the gripping portions of the jaws being of identical contrution, as shown in FIGS. 4 and 5, so that the forces exerted on the subassembly by the jaws during the transfer operation substantially counteract one another. When the spring and cap subassembly 11 is gripped between the lower jaws 33 of the article holding mechanism 32, the air cylinder 64 is deactuated so that when the bell crank lever 48 is retracted to permit indexing of the indexing tables 12 and 16 the air cylinder and the ejector 62 will not eject the subassembly from the lower jaws.

The air cylinder 64 preferably is of a spring return type and may be controlled in any suitable manner. For example, in the illustrated embodiment of the invention, operation of the air cylinder 64 is controlled by an air valve 67 (FIG. 1) mounted on the top of the support member 51, the air valve being connected to the air cylinder by an air line 68, and to a compressed air supply (not shown) by an air line 69. The air valve 67 includes a plunger 71 reciprocally mounted in a housing 72 and biased by an internal spring in the housing so that a projecting outer end of the plunger is engaged with an operating cam 73 on an outwardly projecting portion of the rotating cam shaft 61. The plunger 71 is provided with suitable ports so that when it is engaged with a low portion of the cam 73 it interrupts flow from the abovementioned compressed air supply to the air cylinder 64 and connects the air cylinder to an exhaust line 74, and so that when it comes into engagement with a high portion of the cam it is moved by the cam to connect the air cylinder to the air supply to actuate the air cylinder.

The air should be introduced into the air cylinder 64 at a pressure which is low enough so that the air can be compressed during the transfer of the spring and cap subassembly 11, as above described, without damaging the subassembly or the apparatus, and at a pressure which is high enough to produce the necessary frictional engagement of the ejectors 46 and 62 with the cap member 18.

Synchronization of the indexing of the indexing tables 12, 14 and 16 with one another and with the rotating cam shaft 61 may be accomplished in any suitable manner. For example, the indexing tables 12, 14 and 16 may be driven by Geneva wheels connected to a common drive shaft through suitable drive chains, and the drive shaft may drive the rotating cam shaft 61 through an associated drive chain, in a manner well known to those skilled in the art.

In the illustrated embodiment of the invention, since in the transferring of the subassemblies 11 and 13 into one of the article gripping mechanisms 32 only the subassembly 11 must be transferred without disturbing the orientation of the subassembly about its vertical axis, a retarding member for the subassembly 13 is not required. Thus, the ejector 62 of the article holding mechanism 32 serves as a retarding member for helping prevent rotation of the subassembly 11 during the transfer thereof, and also serves as an article ejecting member for both the lower jaws 33 and the upper jaws 36 of the article gripping mechanism. However, with this arrangement it is seen that after the sub-assembly 11 has been transferred to the article gripping mechanism 32, the ejector 62 will be in a retracted position when the article gripping mechanism is indexed into position adjacent the indexing table 14 for receiving one of the tubular body subasssemblies 13 therefrom, and that the ejector cannot be advanced for the purpose of functioning as a retarding member for the subassembly 13 without ejecting the subassembly 11. Thus, it is apparent that where it is desired to transfer each of the articles or subassemblies 11 and 13 without disturbing the orientation of the article about its vertical axis, it is necessary to provide each of the sets of upper and lower gripping jaws 36 and 33 of each article gripping mechanism 32 with a separate ejector, and to provide an additional air cylinder similar to the air cylinder 64 at the transfer station for the subassemblies 13.

In operation, the indexing tables 12, 14 and 16 are indexed clockwise, as viewed in FIG. 1, into positions such that the gripping jaws 24, 26 of one of the article gripping mechanisms 23 (only one shown) on the table 12 are in alignment with the lower gripping jaws 33 of one of the article gripping mechanisms 32 on the table 16, and such that the gripping jaws 29 of one of the article gripping mechanisms 28 (only one shown) on the table 14 are in alignment with the upper gripping jaws 36 of one of the article gripping mechanisms 32. Further, the plunger portion 62a of the ejector 62 of the article gripping mechanism 32 opposite the article gripping mechanism 23 is in alignment with the piston rod 63 of the air cylinder 64, and the plunger portions 46a and 47a of the ejectors 46 and 47 are adjacent the contacting members 52 and 53 on the operating levers 48 and 49, respectively.

Firmly gripped in the jaws 24, 26 of the article gripping mechanism 23 on the indexing table 12 is one of the spring and cap subassemblies 11, the spring 17 of which has been oriented into a position at a previous station on the indexing table such that the upper coil portion 17a of the spring, after transfer of the subassembly to the indexing table 16 without rotation of the subassembly about its vertical axis, will be properly presented to welding apparatus (not shown) associated with the indexing table 16 for the welding of the coil portion to the ferrule 21 of one of the tubular body subassemblies 13. Similarly, one of the tubular body subassemblies 13 is firmly gripped in the gripping jaws 29 of the article gripping mechanism 28 on the indexing table 14. In the lower gripping jaws 33 of the article gripping mechanism 32 opposite the article gripping mechanism 28, is one of the spring and cap subassemblies 11 which was transferred into the jaws 33 from the indexing table 12 on the preceding cycle of operation.

With the apparatus positioned as above-described, the high portion of the cam 73 moves the plunger 71 of the air valve 67 to actuate the air cylinder 64, and the piston rod 63 of the air cylinder engages and advances the ejector 62 of the adjacent article gripping mechanism 32 to an advanced position between the lower jaws 33 (and the upper jaws 36) of the article gripping mechanism, substantially into engagement with the spring and cap subassembly 11 in the jaws 24, 26 of the article gripping mechanism 23, as shown in FIGS. 4 and 5. The cam 54 then pivots the operating lever 48 to engage the contacting member 52 with the projecting end of the plunger portion 46a of the ejector 46, to move the ejector to an advanced position and to transfer the subassembly 11 from the jaws 24, 26 into the lower jaws 33.

During the transfer of the spring and cap subassembly 11, the air cylinder 64 remains operated so that the ejector 62 acts as a retarding member and tends to retard the transfer of the subassembly. However, as increased pressure is applied by the operating lever 48 to the ejector 46, the subassembly cap member 18, and the ejector 62, the air in the air cylinder 64 is compressed and transfer of the subassembly 11 takes place. Thus, during the transfer of the subassembly 11, the cap member 18 thereof is gripped firmy between the ejectors 46 and 62 such that the frictional engagement of the ejectors with the cap member prevents any substantial rotation of the subassembly about its vertical axis. Further, during the transfer operation the subassembly 11 is gripped firmly by the jaws 24, 26 and the lower jaws 33, such that the frictional engagement of the jaws with the cap member also helps preclude rotation of the subassembly 11. The tendency for the subassembly 11 to rotate during the transfer operation also is reduced by the fact that the gripping portions of the jaws 24, 26 and of the jaws 33 are of identical construction, so that the forces exerted on the cap member 18 by the jaws during the transfer operation substantially counteract one another. When the transfer of the subassembly 11 is complete the low portion of the cam 73 permits the spring-biased plunger 71 of the air valve 67 to return to its original position to deactuate the air cylinder 64 so that when the operating lever 48 is retracted to permit indexing of the indexing tables 12 and 16, the air cylinder and the ejector 62 will not eject the spring and cap subassembly 11 from the lower jaws 33.

After the transfer of the spring and cap subassembly 11 is complete, the cam 54 pivots the operating lever 49 to engage the contacting member 53 with the projecting end of the plunger portion 47a of the ejector 47 of the article gripping mechanism 28 and to advance the ejector between the jaws 29 of the article gripping mechanism. As the ejector 47 is advanced it transfers the tubular body subassembly 13 in the jaws 29 into the upper jaws 36 of the article gripping mechanism 32 opposite the article gripping mechanism 28. This transferring of the subassemblies 11 and 13 is done in sequence to reduce the stress on the apparatus during the transfer operations; however, both subassemblies can be transferred simultaneously, if so desired.

After the operating lever 49 has been retracted by the cam 54, the indexing tables 12, 14 and 16 again are indexed clockwise, as indicated in FIG. 1. The indexing of the table 12 brings its next article gripping mechanism 23, with a new spring and cap subassembly 11 therein, into transfer position, and the indexing of the indexing table 14 similarly brings its next article gripping mechanism 28, and a new tubular body subassembly 13 therein, into transfer position. The indexing of the indexing table 16 moves the article gripping mechanism 32 which is opposite the article gripping mechanism 28 on the indexing table 14, and which now has both a spring and cap subassembly 11 and a tubular body subassembly 13 therein, to a subsequent station; moves the article gripping mechanism 32, to which one of the spring and cap subassemblies 11 has just been transferred, into position opposite the article gripping mechanism 28; and moves the next article gripping mechanism 32 (not shown) thereon into position opposite the article gripping mechanism 23 on the indexing table 12. The above-described cycle of operation then is repeated.

While one embodiment of the invention has been disclosed, many modifications will be apparent and it is intended that the invention be interpreted as including all modifications which fall within the true spirit and scope of the invention.

What is claimed is:

1. Apparatus for transferring an article from a first support to a second support without disturbing the orientation of the article about a preselected axis, which comprises:

an article holding mechanism on the first support including spaced opposed jaws for gripping the article;

an article receiving mechanism on the second support including spaced opposed jaws for receiving the article therebetween from said article holding mechanism;

a pusher member movable between the jaws of said article holding mechanism into engagement with the article to push the article from said article holding mechanism;

a retarding member mounted between the jaws of said article receiving mechanism for movement between advanced and retracted positions;

advancing means for moving said retarding member from its retracted position to its advanced position between the jaws of said article receiving mechanism and substantially into engagement with the article in said article holding mechanism;

operating means for moving said pusher member between the jaws of said article holding mechanism after said retarding member has been moved to its advanced position by said advancing means, to transfer the article from said article holding mechanism to said article receiving mechanism and to push said retarding member to its retracted position against the action of said advancing means such that said retarding member and said pusher member frictionally engage the article to prevent rotation of the article about the preselected axis; and means for rendering said advancing means inoperative after said retarding member has been returned to its retracted position, to preclude ejection of the article from said article receiving mechanism by said retarding member.

2. Apparatus for transferring an article from a first support to a second support without disturbing the orientation of the article about a preselected axis, which comprises:
an article holding mechanism on the first support including spaced opposed jaws for gripping the article firmly therebetween as the article is pushed therefrom during the transfer of the article;
an article receiving mechanism on the second support including spaced opposed jaws for receiving the article therebetween from said article holding mechanism and for gripping the article firmly therebetween as the article is transferred into the jaws from said article holding mechanism;
a pusher member movable between the jaws of said article holding mechanism into engagement with the article to push the article from said article holding mechanism;
a retarding member mounted between the jaws of said article receiving mechanism for movement between advanced and retracted positions;
advancing means for moving said retarding member from its retracted position to its advanced position between the jaws of said article receiving mechanism and substantially into engagement with the article in said article holding mechanism;
operating means for moving said pusher member between the jaws of said article holding mechanism after said retarding member has been moved to its advanced position by said advancing means, to transfer the article from said article holding mechanism to said article receiving mechanism and to push said retarding member to its retracted position against the action of said advancing means such that said retarding member, said pusher member and the jaws of said article holding mechanism and said article receiving mechanism frictionally engage the article to prevent rotation of the article about the preselected axis; and
means for rendering said advancing means inoperative after said retarding member has been returned to its retracted position, to preclude ejection of the article from said article receiving mechanism by said retarding member.

3. Apparatus for transferring an article from a first support to a second support without disturbing the orientation of the article about a preselected axis, as recited in claim 2, in which at least one of the jaws of said article holding mechanism and at least one of the jaws of said article receiving mechanism is resiliently biased toward its other associated jaw, and in which the jaws of said article holding mechanism and the jaws of said article receiving mechanism are substantially identical in construction.

4. Apparatus for transferring an article from a first support to a second support without disturbing the orientation of the article about a preselected axis, as recited in claim 2, in which said advancing means is air operated.

5. Article transfer apparatus, which comprises:
a first article gripping mechanism including spaced, opposed article gripping members for holding a first article therebetween;
a second article gripping mechanism including spaced, opposed article gripping members for holding a second article therebetween;
an indexing support;
first and second article receiving mechanisms on said indexing support, said first article receiving mechanism being movable adjacent said first article gripping mechanism upon indexing of said support and including spaced, opposed article gripping members for receiving the first article therebetween from said first article gripping mechanism, and said second article receiving mechanism being movable adjacent said second article gripping mechanism upon indexing of said support and including spaced, opposed article gripping members for receiving the second article therebetween from said second article gripping mechanism;
pusher members movable between the article gripping members of said article gripping mechanisms into engagement with the articles to push the articles therefrom;
pusher means mounted between the article gripping members of said article receiving mechanisms for movement between advanced and retracted positions;
operating means for moving said pusher members between the article gripping members of said article gripping mechanisms to transfer the articles to said article receiving mechanisms;
advancing means for moving said pusher means from its retracted position to its advanced position between the article gripping members of at least one of said article receiving mechanisms and substantially into engagement with the article in the associated one of said article gripping mechanisms prior to the transfer of the article, said advancing means being operative during the transfer of the article to tend to retain said pusher means in its advanced position such that the article and said pusher member of the associated one of said article gripping mechanisms push said pusher means to its retracted position against the action of said advancing means and said pusher means and said pusher member grip the article firmly therebetween during the transfer of the article to prevent rotation of the article about a preselected axis; and
means for rendering said advancing means inoperative after said pusher means has been returned to its retracted position, to preclude ejection of the article from said one article receiving mechanism by said pusher means.

6. Article transfer apparatus as recited in claim 5, in which one of said article receiving mechanisms is movably mounted on the other of said article receiving mechanisms for assembling of the articles to one another.

References Cited by the Examiner

UNITED STATES PATENTS

| | | | |
|---|---|---|---|
| 2,082,352 | 6/1937 | Neumair | 198—210 |
| 2,827,998 | 3/1958 | Breeback | 198—31 |
| 3,055,490 | 9/1962 | Anderson | 198—211 |
| 3,087,596 | 4/1963 | Fulton | 198—31 |
| 3,128,881 | 4/1964 | Kuhnle | 198—210 X |

MARVIN A. CHAMPION, *Primary Examiner.*